United States Patent
Batarseh et al.

(10) Patent No.: US 10,971,972 B2
(45) Date of Patent: *Apr. 6, 2021

(54) SELF-POWERED PIPELINE HYDRATE PREVENTION SYSTEM

(71) Applicant: Saudi Arabian Oil Company, Dhahran (SA)

(72) Inventors: Sameeh Batarseh, Dhahran (SA); Nabeel Al Habib, Dhahran (SA); Talha Jamal Ahmad, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,146

(22) Filed: Mar. 5, 2019

(65) Prior Publication Data

US 2019/0199168 A1 Jun. 27, 2019

Related U.S. Application Data

(63) Continuation of application No. 15/260,386, filed on Sep. 9, 2016, now Pat. No. 10,277,094.

(Continued)

(51) Int. Cl.
*H02K 7/18* (2006.01)
*H05B 1/02* (2006.01)
(Continued)

(52) U.S. Cl.
CPC .......... *H02K 7/1823* (2013.01); *E21B 36/04* (2013.01); *F16L 53/38* (2018.01); *F17D 1/05* (2013.01);
(Continued)

(58) Field of Classification Search
CPC .. F16L 53/35; F16L 53/38; F17D 1/05; F17D 1/08; F17D 1/088; H02K 7/1823;
(Continued)

(56) References Cited

U.S. PATENT DOCUMENTS 3,342,267 A ‡ 9/1967 Cotter .................. E21B 36/04
166/60
3,548,438 A ‡ 12/1970 Ghormley .............. E21B 33/068
134/168 C (Continued)

FOREIGN PATENT DOCUMENTS

CN 101608118 B ‡ 7/2012
CN 101608118 B 7/2012

(Continued)

OTHER PUBLICATIONS

International Search Report and Written Opinion for related PCT application PCT/US2016/051884 dated Nov. 24, 2016.‡

(Continued)

*Primary Examiner* — Kevin F Murphy
*Assistant Examiner* — Jonathan J Waddy
(74) *Attorney, Agent, or Firm* — Bracewell LLP; Constance G. Rhebergen; Linda L. Morgan (57) ABSTRACT

A system for preventing hydrate formation in a pipeline includes a heater housing. The heater housing has an outer diameter sized to travel within the pipeline. A turbine assembly is located within the heater housing. The turbine assembly has a blade that is rotatable by a flow of fluid within the pipeline. An electric heater is located within the heater housing and is electrically connected to the turbine assembly. The electric heater is selectively contacted by the flow of fluid within the pipeline.

10 Claims, 6 Drawing Sheets

Related U.S. Application Data (60) Provisional application No. 62/219,272, filed on Sep. 16, 2015.

(51) Int. Cl.
  *E21B 36/04*  (2006.01)
  *F17D 1/05*  (2006.01)
  *F16L 53/38*  (2018.01)

(52) U.S. Cl.
  CPC ............ *H05B 1/02* (2013.01); *H05B 1/0244* (2013.01); *Y10T 137/6606* (2015.04)

(58) Field of Classification Search
  CPC ......... H05B 1/02; H05B 1/0244; E21B 36/04; E21B 37/04; Y10T 137/6606
  USPC ................ 137/334, 341; 60/398; 290/43, 54
  See application file for complete search history.

(56) References Cited

U.S. PATENT DOCUMENTS

| | | | |
|---|---|---|---|
| 4,316,077 A * | 2/1982 | Carlson | A45D 20/12 165/103 |
| 4,369,373 A ‡ | 1/1983 | Wiseman | E21B 36/04 290/2 |
| 4,740,711 A ‡ | 4/1988 | Sato | F01B 13/061 290/52 |
| 6,490,506 B1 ‡ | 12/2002 | March | G05B 23/0283 290/43 |
| 6,585,047 B2 ‡ | 7/2003 | McClung, III | E21B 17/01 166/302 |
| 6,792,641 B1 ‡ | 9/2004 | Laker | B08B 9/0557 118/10 |
| 7,002,261 B2 ‡ | 2/2006 | Cousins | E21B 41/0085 290/43 |
| 7,814,993 B2 ‡ | 10/2010 | White | E21B 41/0085 175/107 |
| 8,375,717 B2 ‡ | 2/2013 | Lourenco | F02C 1/02 60/643 |
| 8,610,303 B2 ‡ | 12/2013 | Yocum, Jr. | F03B 13/02 290/43 |
| 2008/0163700 A1 ‡ | 7/2008 | Huang | G01B 17/025 73/861.25 |
| 2009/0057291 A1 ‡ | 3/2009 | Ziemek | F16L 53/38 219/260 |
| 2010/0043439 A1 ‡ | 2/2010 | Lourenco | F02C 1/02 60/650 |
| 2010/0189895 A1 ‡ | 7/2010 | Arndt | B05D 3/0254 427/231 |
| 2010/0237619 A1 ‡ | 9/2010 | Pozivil | F01D 3/04 290/52 |
| 2010/0260593 A1 ‡ | 10/2010 | Cumings | F03D 3/0472 415/1 |
| 2011/0061383 A1 ‡ | 3/2011 | McAlister | F03G 6/00 60/641.7 |
| 2011/0064644 A1 ‡ | 3/2011 | McAlister | C01B 3/24 423/445 R |
| 2012/0139251 A1 ‡ | 6/2012 | Pai | F03B 17/067 290/54 |
| 2012/0150413 A1 ‡ | 6/2012 | Bunce | F02C 9/28 701/100 |
| 2012/0175881 A1 ‡ | 7/2012 | Rosefsky | F03B 13/00 290/54 |
| 2012/0298396 A1 * | 11/2012 | Hong | D01F 9/127 174/107 |
| 2013/0341930 A1 ‡ | 12/2013 | Campagna | F03B 3/04 290/54 |
| 2014/0077497 A1 ‡ | 3/2014 | Letang | F03B 13/00 290/54 |
| 2014/0144647 A1 ‡ | 5/2014 | McAnally | E21B 36/005 166/36 |
| 2015/0159797 A1 ‡ | 6/2015 | Baker | H02M 7/043 138/33 |
| 2015/0291412 A1 ‡ | 10/2015 | Larsson | F16L 53/008 137/1 |
| 2016/0237979 A1 ‡ | 8/2016 | Clements | F03B 13/00 |

FOREIGN PATENT DOCUMENTS

| | | | | |
|---|---|---|---|---|
| CN | 202746940 U ‡ | 2/2013 | | |
| CN | 202746940 U | 2/2013 | | |
| CN | 101906293 B ‡ | 6/2013 | | |
| CN | 101906293 B | 6/2013 | | |
| CN | 102383766 B ‡ | 11/2013 | | |
| CN | 102383766 B | 11/2013 | | |
| WO | WO2013105951 A1 ‡ | 7/2013 | ............ | E21B 36/04 |
| WO | WO2013105951 A1 | 7/2013 | | |
| WO | WO2014209786 A1 ‡ | 12/2014 | ............ | E21B 43/26 |
| WO | WO2014209786 A1 | 12/2014 | | |
| WO | WO2015059444 A1 ‡ | 4/2015 | ............ | F03B 13/00 |
| WO | WO2015059444 A1 | 4/2015 | | |

OTHER PUBLICATIONS

Pancakarsa, Kresnajaya Prasetia, Design of Contraflow Cleaning PIG for Pipeline Maintenance, Thesis for Masters of Science in Mechanical Engineering, Mar. 16, 2009.‡

\* cited by examiner
‡ imported from a related application

SELF-POWERED PIPELINE HYDRATE PREVENTION SYSTEM

CROSS REFERENCE TO RELATED APPLICATION

This application is a continuation of, and claims priority to and the benefit of, co-pending U.S. application Ser. No. 15/260,386 filed Sep. 9, 2016, titled "Self-Powered Pipeline Hydrate Prevention System," which claims priority to and the benefit of U.S. Provisional Application Ser. No. 62/219,272, filed Sep. 16, 2015, titled "Self-Powered Pipeline Hydrate Prevention System," the full disclosure of each which is hereby incorporated herein by reference in its entirety for all purposes.

BACKGROUND OF THE DISCLOSURE

1. Field of the Disclosure

The present disclosure relates generally to the prevention of hydrate formation in pipelines, and more specifically to maintaining the temperature of fluids flowing through a pipeline above a target value.

2. Description of the Related Art

In natural gas pipelines, drops in temperature can cause the formation of crystalline water-based solids, which is known as hydrate. The formation of hydrate can block the pipeline and slow down or shutdown gas production.

Many current methods have been attempted to alleviate the problems associated with the formation of hydrates. The formation of hydrates is not only dependent on the temperature, but also the pressure of the hydrocarbons and the chemical composition of the fluids flowing through the pipeline. The fluids flowing through the pipeline may also be affected by the formation of wax deposits which is also temperature dependent.

In some current systems, an inhibitor can be injected into the pipeline, insulation materials can coat the pipeline to help the pipeline retain heat, or electrical heating systems can be used to heat the pipeline. These systems can be expensive and inefficient and can raise other issues such as the extraction of the inhibitor from the hydrocarbons, a less than ideal coverage with insulation materials and a limit in the length of pipeline that can be heated with an electrical heating system. Other current systems require external power sources and robotics. When such components fail, the entire heating system can fail. Upon such failure, retrieval of the system can be challenging.

SUMMARY OF THE DISCLOSURE

Embodiments of the present disclosure provide systems and method that use energy harvesting principles to prevent the formation of hydrate. Energy from the flow of gas within the pipeline is used to rotate a turbine assembly that is inserted in the pipeline. The turbine assembly converts this rotational mechanical energy into heat with electrical heaters over which the fluids within the pipeline flow. The heaters maintain the fluids and the pipeline above a hydrate formation temperature and prevent the formation of hydrate. In embodiments of this disclosure, no external power source or robotic type equipment is required, which saves on the weight of the system and also increases reliability since there are fewer components at risk of failure.

In an embodiment of this disclosure a system for preventing hydrate formation in a pipeline includes a heater housing. The heater housing has an outer diameter sized to travel within the pipeline. A turbine assembly is located within the heater housing. The turbine assembly has a blade that is rotatable by a flow of fluid within the pipeline. An electric heater is located within the heater housing and is electrically connected to the turbine assembly. The electric heater is selectively contacted by the flow of fluid within the pipeline.

In alternate embodiments, the turbine assembly can further include a generator and an electrical connector. The generator can be mechanically connected to the blade and the electrical connector can extend from the generator to the electric heater. An acoustic system can include an acoustic transmitter and an acoustic receiver that selectively measures sound travel time. The acoustic receiver can be in communication with a control system connected to the turbine assembly.

In other alternate embodiments, a control system is connected to the electric heater. The electric heater can have an off condition and an on condition and can be selectively switched between the off condition and the on condition by the control system. The control system can include a temperature sensor that senses a real time temperature within the pipeline. The electric heater can be switched from an off condition to an on condition when the real time temperature falls below a lower temperature limit. The electric heater can be in an off condition when the real time temperature is above an upper temperature limit. The turbine assembly can be a variable speed turbine assembly that has a rate of rotation of the blade selectively controlled by the control system.

In yet other alternate embodiments, the system also has a second turbine assembly. The turbine assemblies can be spaced apart within the pipeline and be electrically connected with a flexible conductor. A scrubber can be located at an outer surface of the blade. The scrubber can selectively remove a material from an interior surface of one of the pipeline and the heater housing. The heater housing can be selected from a group consisting of a wire frame and a pipe. The electric heater can include a ceramic outer layer. The electric heater can be selected from a group consisting of a mesh heater and a plate heater and a combination thereof.

In another embodiment of this disclosure, a method for preventing hydrate formation in a pipeline includes providing a heater housing. The heater housing can have an outer diameter sized to travel within the pipeline. A turbine assembly can be located within the heater housing. The turbine assembly can have a blade that is rotatable by a flow of fluid within the pipeline. An electric heater can be located within the heater housing and can be electrically connected to the turbine assembly. The heater housing can be inserted into the pipeline so that the electric heater contacts and heats the flow of fluid within the pipeline and the flow of fluid in the pipeline causes a rotation of the blade.

In alternate embodiments, the rotation of the blade can be converted to an electric power with a generator and the electric power can be conveyed to the electric heater with an electrical connector that extends from the generator to the electric heater. The electric heater can be switched between an off condition and an on condition with a control system that is connected to the electric heater. A real time temperature can be sensed within the pipeline with a temperature sensor of the control system. The electric heater can be switched from an off condition to an on condition with the control system when the real time temperature falls below a lower temperature limit. The electric heater can be switched from an on condition to an off condition with the control system when the real time temperature rises above an upper temperature limit.

In other alternate embodiments, the rate of rotation of the blade can be controlled with the control system that is connected to the turbine assembly. An acoustic system can be provided that has an acoustic transmitter and an acoustic receiver. An acoustic signal can be transmitted with the acoustic transmitter and received with the acoustic receiver. The sound travel time between the acoustic transmitter and the acoustic receiver can be measured. The acoustic system can be in communication with the control system connected to the turbine assembly and a condition of one of the pipeline, the turbine assembly and the flow of fluid can be determined from the sound travel time. The performance of the turbine assembly can be adjusted with the control system as a result of the condition.

In yet other embodiments, a second turbine assembly can be provided. The turbine assemblies can be electrically connected with a flexible conductor, and the turbine assemblies can be spaced apart within the pipeline. A material can be removed from an interior surface of one of the pipeline and the heater housing with a scrubber that is located at an outer surface of the blade.

BRIEF DESCRIPTION OF THE DRAWINGS

So that the manner in which the above-recited features, aspects and advantages of the disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION OF THE EXEMPLARY EMBODIMENTS

Embodiments of the present disclosure will now be described more fully hereinafter with reference to the accompanying drawings which illustrate embodiments of the disclosure. This disclosure may, however, be embodied in many different forms and should not be construed as limited to the illustrated embodiments set forth herein. Those of skill in the art understand that the disclosure is not limited to or by the description of embodiments given in the Specification. Rather, these embodiments are provided so that this disclosure will be thorough and complete, and will fully convey the scope of the disclosure to those skilled in the art. Like numbers refer to like elements throughout, and the prime notation, if used, indicates similar elements in alternate embodiments or positions.

In the following discussion, numerous specific details are set forth to provide a thorough understanding of the present disclosure. However, it will be obvious to those skilled in the art that the systems and methods of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Those of skill in the art also understand that the terminology used for describing particular embodiments does not limit the scope or breadth of the disclosure. In interpreting this disclosure, including the appended Claims, all terms should be interpreted in the broadest possible manner consistent with the context of each term. All technical and scientific terms used in this disclosure, including the appended Claims have the same meaning as commonly understood by one of ordinary skill in the art to which this disclosure belongs unless defined otherwise.

As used herein, the singular forms "a", "an" and "the" include plural references unless the context clearly indicates otherwise. The referenced elements, components or steps may be present, utilized or combined with other elements, components or steps not expressly referenced. "Associated" and its various forms means something connected with something else because they occur together or that one produces the other. "Detect" and its conjugated forms should be interpreted to mean the identification of the presence or existence of a characteristic or property. "Determine" and its conjugated forms should be interpreted to mean the ascertainment or establishment through analysis or calculation of a characteristic or property.

Spatial terms describe the relative position of an object or a group of objects relative to another object or group of objects. The spatial relationships apply along vertical and horizontal axes. Orientation and relational words, including "uphole" and "downhole", are for descriptive convenience and are not limiting unless otherwise indicated.

Where this disclosure, including the appended Claims, provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where this disclosure, including the appended Claims, reference a method comprising two or more defined steps, the defined steps can be carried out in any order or simultaneously except where the context excludes that possibility.

Figure 1:
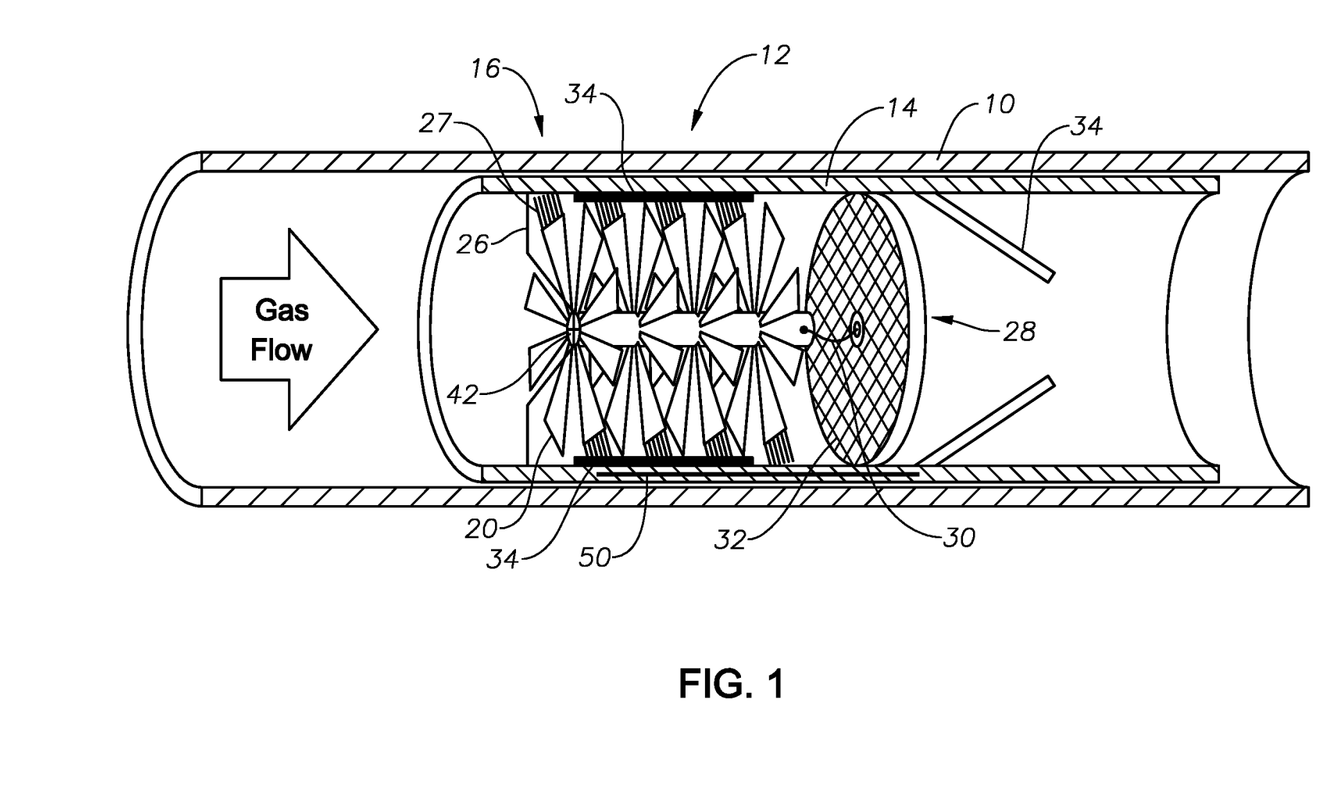
FIG. 1 is a section view of a pipeline with a hydrate prevention assembly in accordance with an embodiment of this disclosure.

Looking at FIG. 1, pipeline 10 can be used to convey a fluid, such as a gaseous hydrocarbon mixture such as a natural gas. Pipeline 10 can carry an unprocessed hydrocarbon gas that contains elements such as methane, ethane, propane, isobutane, carbon dioxide, nitrogen, and hydrogen sulfide, any of which together with free water, can form hydrates under certain temperature and pressure conditions. Pipeline 10 can extend for long distances, such as many miles. As an example, pipeline 10 can extend from a gas field to a production facility that may be 68 miles (110 km) or more away. Pipeline 10 can be located on land or located offshore.

In order to prevent the formation and building of hydrates within pipeline 10, hydrate prevention assembly 12 can be inserted in pipeline 10. Hydrate prevention assembly 12 can target a hydrate formation zone within pipeline 10 where hydrates are prone to form. Hydrate prevention assembly 12 is a self contained unit without external power source requirements. In order to optimize the performance of hydrate prevention assembly 12 within pipeline 10, a computer simulation can be conducted for a particular length of pipeline 10 with parameters that include the general composition of the unprocessed hydrocarbon gas within pipeline 10. Elements of hydrate prevention assembly 12 can then be tuned and synchronized to provide a single package unit to meet the hydrate prevention requirements of such pipeline 12. Hydrate prevention assembly 12 can be inserted into pipeline 10 and moved along a desired interval along the length of pipeline 10, by the flow of fluids through pipeline 10. As will be discussed further herein, the flow of fluid through pipeline 10 is also used to generate heat to maintain both the flow of fluid through pipeline 10 as well as pipeline 10 above a hydrate formation temperature. In certain embodiments, hydrate prevention assembly 12 can be inserted into pipeline 10 and be pushed through pipeline 10 by the energy of the flowing hydrocarbon gas within pipeline 10. Once hydrate prevention assembly 12 reaches a target hydrate formation zone, hydrate prevention assembly 12 can remain stationary and operate at such hydrate formation zone. In alternate embodiments, hydrate prevention assembly 12 can travel back and forth through pipeline 10 over a determined time interval and a selected distance along pipeline 10. The hydrate prevention assembly 12 can be pushed downstream through pipeline 10 by the energy of the fluid flowing within pipeline 10, and can mechanically at on the flow of fluid through pipeline 10 to travel upstream. As will be discussed below, hydrate prevention assembly 12 can be designed to utilize the energy of the fluid flowing through pipeline 10 to both power hydrate prevention assembly 12 and provide propulsion for hydrate prevention assembly 12 to travel upstream within pipeline 10. In other embodiments, alternate mechanical means can be used to move hydrate prevention assembly 12 upstream within pipeline 10.

Hydrate prevention assembly 12 can include heater housing 14. Heater housing 14 has an outer diameter sized to travel within pipeline 10. As an example, heater housing 14 can be sized to fit within the inner diameter of pipeline 10 so that there is little to no space between the outer diameter of heater housing 14 and the inner diameter of pipeline 10 so that hydrate will not form in any gap between the outer diameter of heater housing 14 and the inner diameter of pipeline 10. Heater housing 14 supports and carries elements of hydrate prevention assembly as hydrate prevention assembly 12 travels along pipeline 10. In the example of FIG. 1, heater housing 14 is a pipe and in the example of FIG. 2, heater housing is a wire frame. In alternate embodiments, heater housing 14 can be formed of other structural members that can support the elements of hydrate prevention assembly 12.

Turbine assembly 16 can be located within heater housing 14. Looking at FIG. 4, turbine assembly 16 can include a generator 18 and blade 20. Generator 18 is powered by the rotation of blade 20. Blade 20 is rotateable by the flow of the fluids within pipeline 10 passing over blade 20. Each turbine assembly can have one or more blades 20. Blade 20 and other components of turbine assembly 16 can be formed of light-weight non-corrosive materials such aluminum. FIGS. 3A-3E, disclose a number of embodiments of turbine assembly 16 with various configurations of blade 20. Blade 20 can be designed to both power generator 18 and to mechanically act on the flow of fluids within pipeline 10 to reverse the direction of hydrate prevention assembly 12 so that hydrate prevention assembly 12 can travel upstream within pipeline 10.

Figure 4:
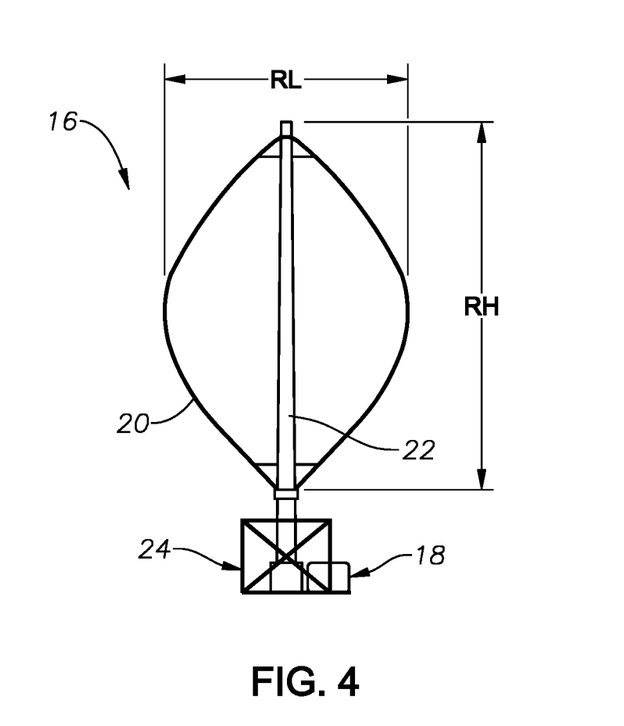
FIG. 4 is a schematic perspective view of a turbine assembly of a hydrate prevention assembly in accordance with an embodiment of this disclosure.

As blade 20 rotates, shaft 22 that is mechanically connected to blade 20 provides rotational input to generator 18. Through shaft 22, generator 18 is mechanically connected to blade 20. Gear box 24 can vary the relative rate of rotation between blade 20 and the rotational input to generator 18. Generator 18 can convert the rotational input of shaft 22 to electric power.

Figure 2:
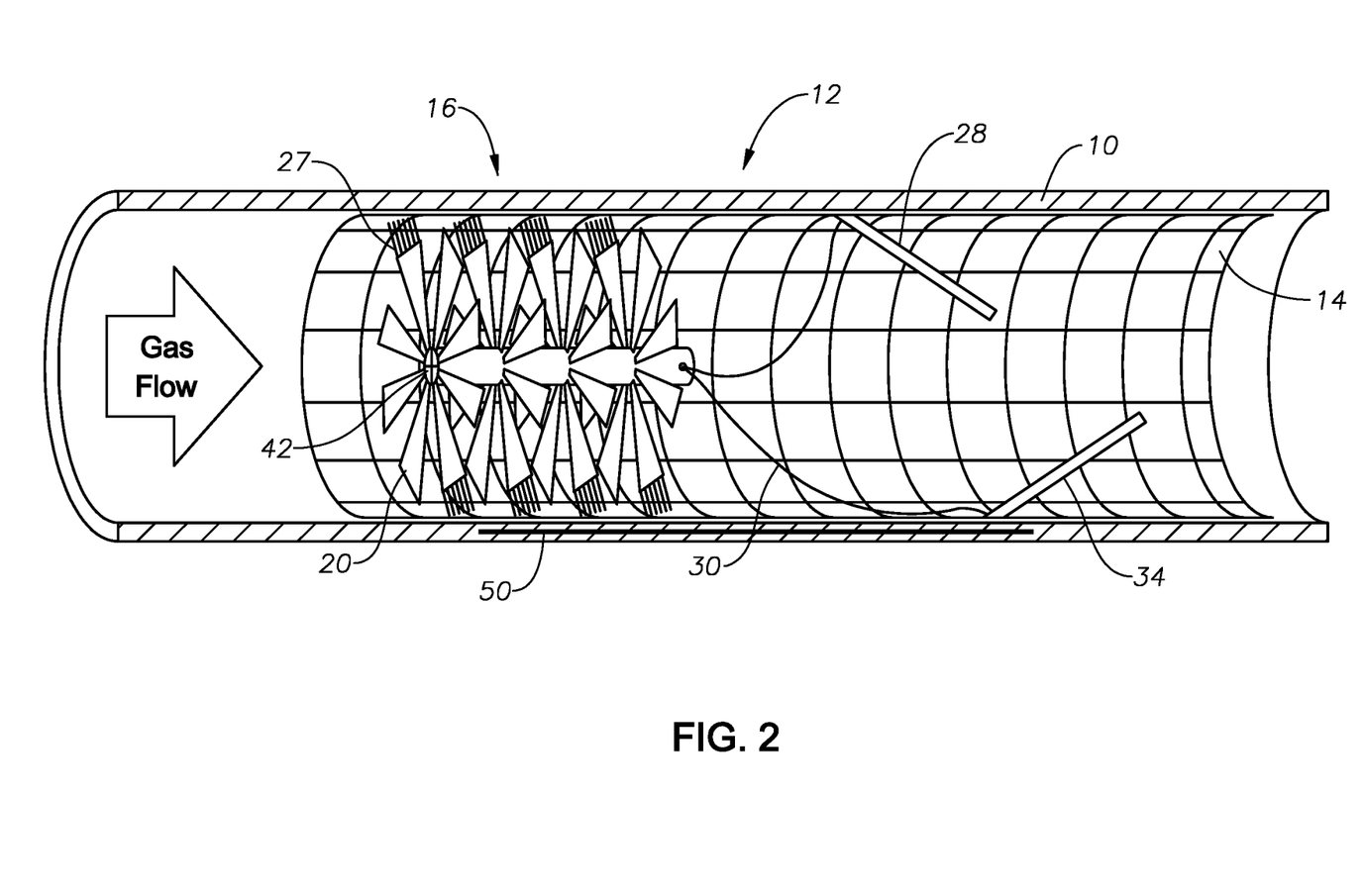
FIG. 2 is a section view of a pipeline with a hydrate prevention assembly in accordance with an embodiment of this disclosure.
Figure 3A:
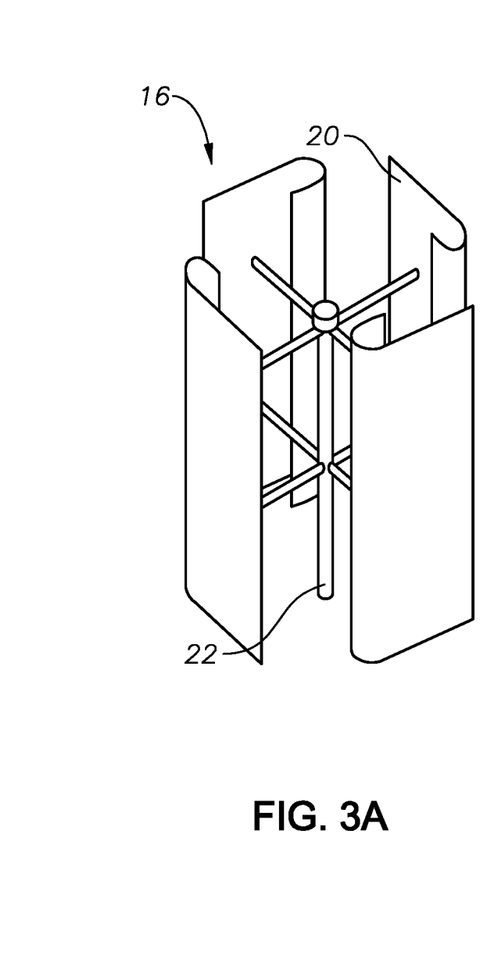
FIGS. 3A-3G are perspective views of alternate embodiments of blades of turbine assemblies of a hydrate prevention assembly in accordance with an embodiment of this disclosure.
Figure 3B:
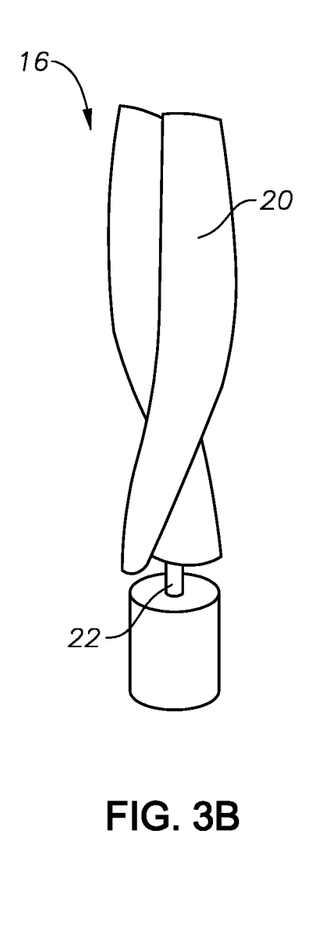
Figure 3C:
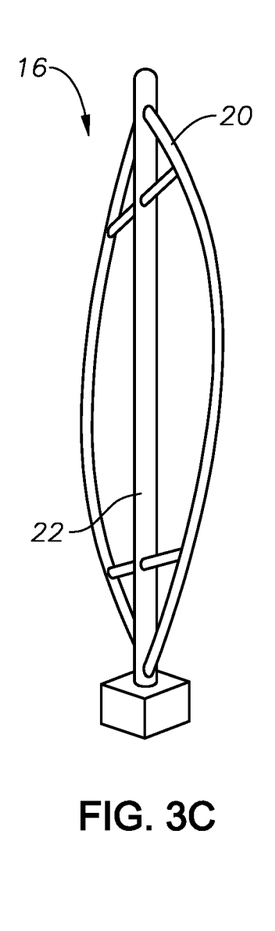
Figure 3D:
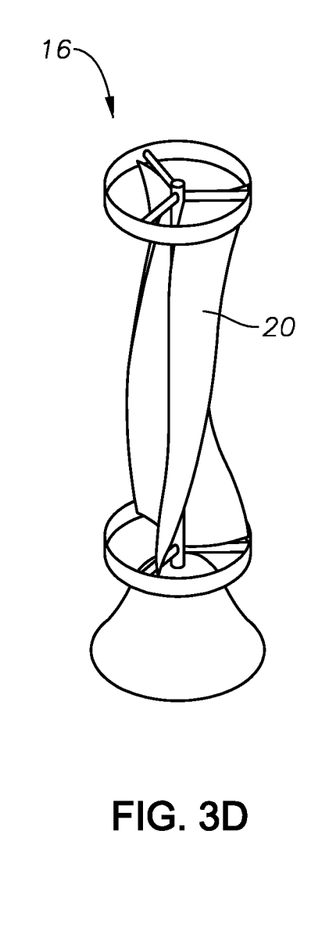
Figure 3E:
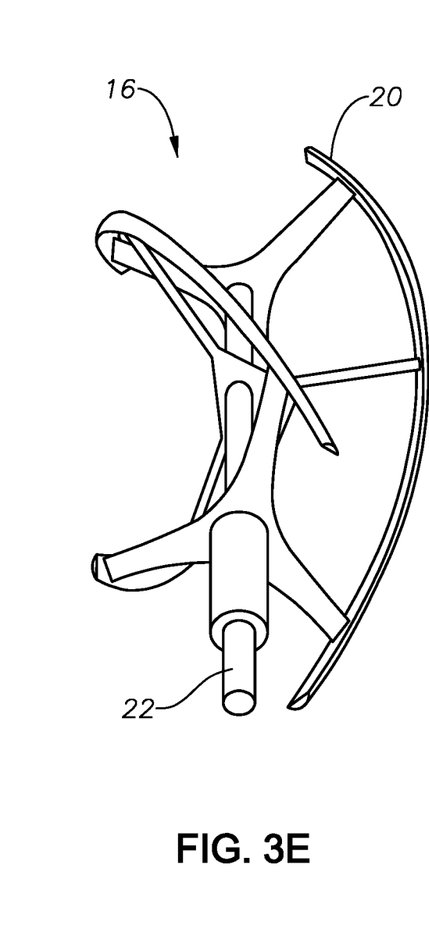
Figure 3F:
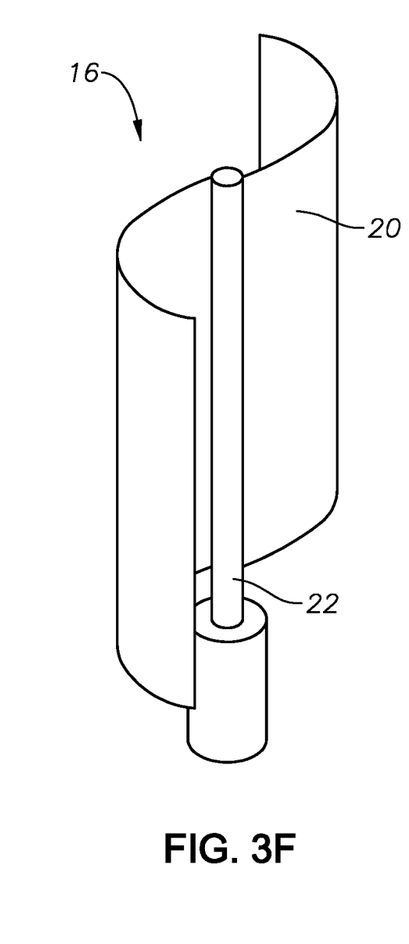
Figure 3G:
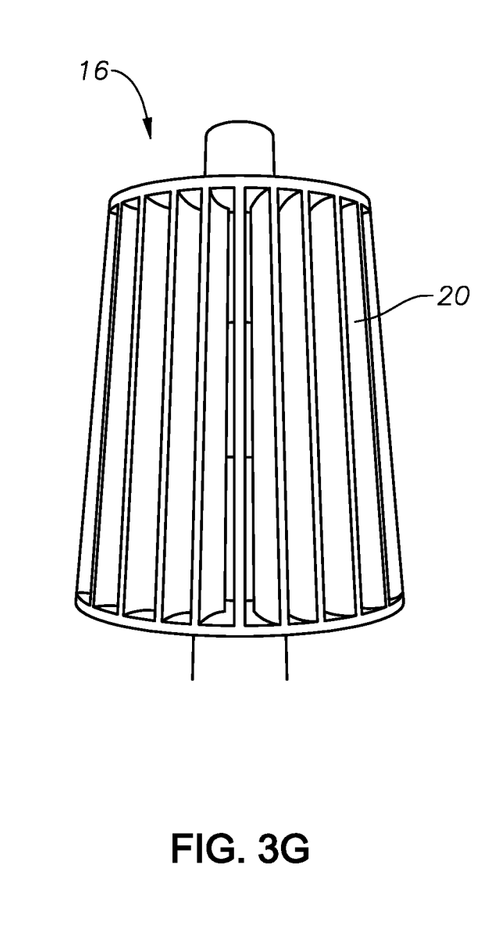

Turbine assembly 16 can be secured within heater housing 14 by struts 26 (FIG. 1) or by other mechanical means. The design of the turbine assembly can be affected by a number of factors, such as the required electrical power, the dimensions of the pipeline and the heater housing, the number of blades 20, and the velocity of the flow of fluid through pipeline 10. In certain embodiments, turbine assembly 16 may be oriented so that the axis of rotation of blade 20 and shaft 22 are both generally perpendicular to the direction of gas flow through pipeline 10 and blade 20 can have a vertical turbine design (FIG. 4). An advantage of such vertical turbine embodiments are that the blades 20 have a relatively simple design and fabrication procedure because in some embodiments the blades have constant shape along their length. In other embodiments, turbine assembly 16 may be oriented so the axis of rotation of blade 20 and shaft 22 are both generally parallel to the direction of gas flow through pipeline 10 and blade 20 can have a traditional turbine design (FIG. 2).

Blade 20 can include scrubbers 27 located along the edges of blade 20. Scrubbers 27 can be, for example, thin stainless steel bristles that are rust and corrosion resistant. Scrubbers 27 selectively removing a material, such as hydrate. When heater housing 14 is a pipe, scrubbers 27 will scrub and interior surface of heater housing 14. When heater housing 14 is a wire frame, scrubbers 27 will scrub and interior surface of heater housing 14 and of pipeline 10.

Hydrate prevention assembly 12 can further include electric heater 28. Electric heater 28 can be electrically connected to turbine assembly 16 so that generator 18 can provide the electric power required to operate electric heater 28. Electrical conductor 30 can extend from generator 18 to electric heater 28 to convey the electric power generated by generator 18 to electric heater 28. The flow of fluid within pipeline 10 can be in contact with and pass over electric heater 28 so that electric heater 28 can directly heat the flow of fluid within pipeline 10 and thereby indirectly heat pipeline 10 itself. Alternately, electric heater 28 can be in direct contact with the sidewall of pipeline 10 to directly heat pipeline 10.

Hydrate prevention assembly 12 can include more than one electric heater 28. The configuration of electric heaters 28 will be based in part on the volume and pressure of fluid flowing through pipeline 10. Mesh heater 32 can be a generally disk shaped electric heater 28 with a number of holes extending through the thickness of the disk to form a mesh-like structure. Mesh heater 32 can be positioned generally perpendicular to the flow of fluid through pipeline 10 so that the fluid passes through the holes of mesh heater 32.

Plate heater 34 can be a generally planar member and positioned at an angle relative to the flow of fluid through pipeline 10. Plate heater 34 is located within hydrate prevention assembly 12 at an angle to function as a choke, forcing the fluid within pipeline 10 to pass through a narrow path so that the molecules bombard each other, creating friction and heat within the molecules. Therefore even without any electric power being supplied to plate heater 34, plate heater 34 can operate to heat the fluids within pipeline 10 by creating such friction and heat within the molecules. Plate heater 34 is also configured and designed to maximize and ensure full contact between the molecules of the fluid within pipeline 10 and the heated plate surface. In alternate embodiments, plate heater 34 can be aligned parallel to a sidewall of heater housing 14 to provide alternate or additional heat to the fluid within pipeline 10.

Looking at FIG. 1, in certain embodiments, both mesh heater 32 and plate heater 34 can be used. The fluid in the pipeline 10 will pass through mesh heater 32 and contact plate heater 34, resulting in the heating up the fluid and of pipeline 10 to maintain the temperature within pipeline 10 within the desired temperature range and above the hydrate formation temperature.

In alternate examples, such as shown in FIG. 2, only plate heater 34 may be used and no mesh heater 32 is included. In yet other alternate embodiments, only mesh heater 32 may be used and no plate heater 34 may be used. Embodiments with only mesh heater 32 or only plate heater 34 may be of particular use, for example in pipelines with a large volume of fluid flow.

Electric heater 28 can be formed of a heating element that is coated with a ceramic material so that electric heater 28 has a ceramic outer layer. Direct contact of the heating element with natural gas could cause an ignition hazard. Ceramic materials are efficient electrical insulators, and therefore can reduce the risk of ignition of the fluids flowing within pipeline 10. Ceramic materials also provide excellent thermal conductivity and heat will be transferred from the heating element to the fluid within pipeline 10 by way of the ceramic material. The heating element can be formed of, for example, graphene, copper or nichrome, or other heating element material with high heat conductivity for efficient heat properties known in the art. In certain embodiments, the heating elements are preferably formed of graphene coated with ceramic to provide a light weight and strong electric heater 28 with superior thermal properties.

Figure 5:
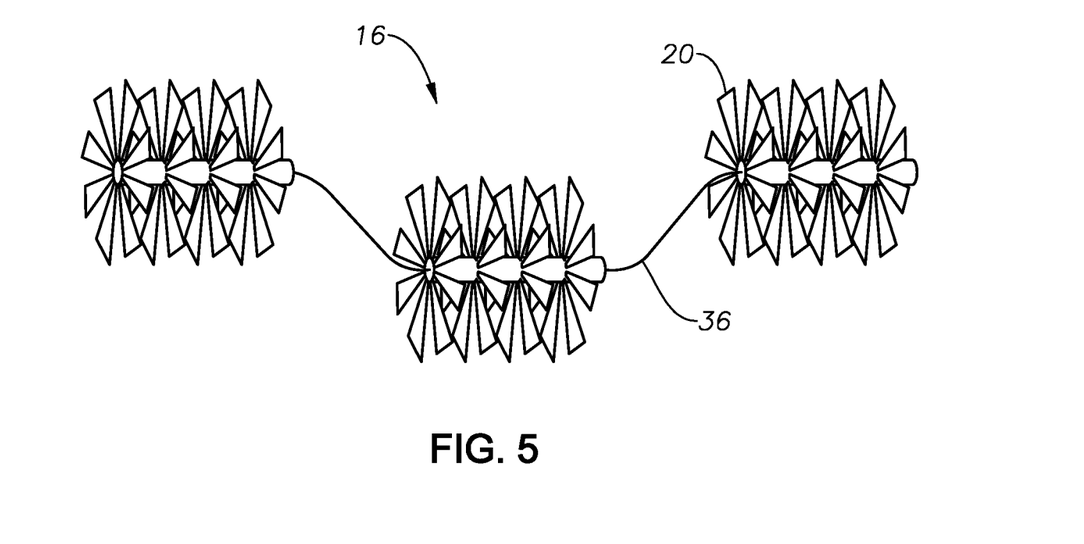
FIG. 5 is a schematic perspective view of multiple connected turbine assemblies of a hydrate prevention assembly in accordance with an embodiment of this disclosure.

Looking at FIG. 5, in certain embodiments, there maybe more than one turbine assembly 16. A second turbine assembly 16 and additional turbine assemblies 16 can be connected together with flexible conductor 36 to allow for the transfer of power and communications between the turbine assemblies. The turbine assemblies 16 can be spaced apart so that when inserted into pipeline 10, turbine assemblies 16 will be spaced apart within pipeline 10. Flexible conductor 36 is sufficiently bendable to fit and bend along corners and curves within the pipeline. Each turbine assembly 16 can be housed within an individual heater housing 14 and electrically connected to its own electric heater 28. The distance between adjacent turbine assemblies 16 will depend on the heat flow inside pipeline 10. As an example, adjacent turbine assemblies 16 may be placed at an approximate distance of 1640 feet (500 m) to 3281 feet (1000 m) apart. In order to determine an appropriate distance between successive turbine assemblies 16, a temperature profile of pipeline 10 can be generated. The temperature profile can determine the distance that the fluid within pipeline 10 can travel before the fluid reaches hydrate-formation conditions. The calculations required to generate a temperature profile of pipeline 10 includes fairly complex calculations that depend on a number of parameters including specific gravity, gas flowing rate, the length and inner diameter of pipeline 10, the inlet pressure and temperature, heat-transfer coefficient, gas heat capacity and outside ambient temperature.

Figure 6:
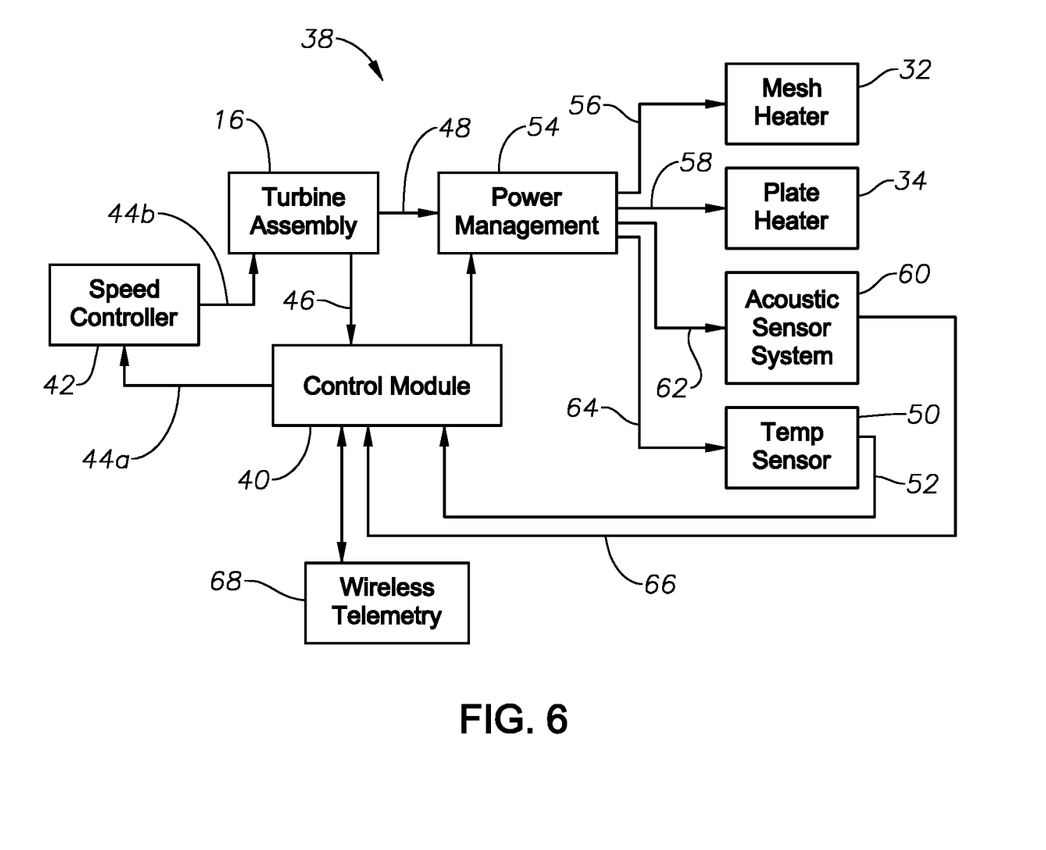
FIG. 6 is a schematic diagram of a control system of a hydrate prevention assembly in accordance with an embodiment of this disclosure.

Turning to FIG. 6, control system 38 can be included in hydrate prevention assembly 12. Control module 40 can include a micro-controller and can intelligently control the operation of hydrate prevention assembly 12. Control system 38 can perform a number of functions, including controlling the speed of rotation of blade 20. Control system 38 can have a control module 40 that is connected to, and in communication with, turbine assembly 16 through a speed control communication line 44a, 44b by way of speed controller 42. Turbine assembly 16 can be a variable speed turbine assembly that has a rate of rotation of the blade that can be controlled by speed controller 42 of control system 38. As an example, turbine assembly 16 can be pitch controlled or active stall controlled. One or more sensors can be integrated with turbine assembly 16, including vibration sensors on shaft 22, or a temperature sensor in gear box 24, to monitor the operation and health of turbine assembly. The output of these sensors can be provided through sensor communication line 46 to control circuitry and the speed of the turbine assembly 16 can be adjusted in case of overheating or over speed of blade 20 and shaft 22 that could cause damage to hydrate prevention assembly 12.

Power output 48 from turbine assembly 16 can be monitored continuously with control system 38 and the speed of turbine assembly 16 can be adjusted when required. Turbine assembly 16 can further be controlled by control system 38 to turn electric heater 28 from an on condition to an off condition. As an example, when ambient temperatures are elevated, such as during summer months, electric heater 28 may be left in an off condition for a number or weeks or a number of months because the higher outside temperature will prevent the formation of hydrates within pipeline 10. Electric heater 28 can be turned off by using speed controller 42 to reduce the speed of turbine assembly 16 to nothing, or by using electrically controlled brakes to completely stop turbine assembly 16 in the summer time.

Electric heater 28 can also be controlled to switch between an off condition and an on condition in order to maintain the temperature within pipeline 10 within a desired temperature range. Temperature sensors 50 can be embedded in heater housing 14 or located elsewhere within hydrate prevention assembly 12. Temperature sensor 50 can be, as an example, a fiber optic temperature sensor and can assist in monitoring the health of hydrate prevention assembly 12, trouble shoot any problems with hydrate prevention assembly 12, and to monitor the real time temperature within pipeline 10. Output from temperature sensor 50 can be conveyed to control module 40 through temperature communication line 52. The real-time temperature sensed by temperature sensor 50 can be monitored and continuously fed back to control module 40 through temperature communication line 52 so that speed controller can alternately made adjustments to the speed of the rotation of blades 20 of turbine assembly 16 throughout the operation of hydrate prevention assembly 12.

The desired temperature rage can have a lower temperature limit and an upper temperature limit. The lower temperature limit can be above the hydrate formation temperature for the given pressure and composition of the fluid flowing through pipeline 10. The upper temperature limit can be well below an ignition temperature of the fluids flowing through pipeline 10. As an example, the lower temperature limit might be in the range 50 to 80 degrees Fahrenheit. The upper temperature limit might be in the range of 90 to 100 degrees Fahrenheit. Using, as an example, a lower temperature limit of 80 degrees Fahrenheit and an upper temperature limit of 100 degrees Fahrenheit, control system 38 will switch electric heater 28 to an off condition when the temperature within pipeline 10 reaches 100 degrees Fahrenheit or rises above 100 degrees Fahrenheit. Electric heater 28 can be switched to the off condition with speed controller 42 by reducing or stopping the rotation of blades 20 of turbine assembly 16. If the temperature within pipeline 10 reaches or falls below 80 degrees Fahrenheit, electric heater 28 will be switched to an on condition. Electric heater 28 can be switched to the on condition with speed controller 42 by increasing the rotation of blades 20 of turbine assembly 16.

Control system 38 can further include a power management module 54. Power management module 54 can be connected to, and in communication with, generator 18 and can manage the electric power generated by generator 18. The power output 48 from turbine assembly 16 can be very high and can vary with the flow rate of fluids through pipeline 10. Power management module 54 can step-down the DC voltage to a lower voltage before delivering the electric power to mesh heater 32 by way of mesh heater line 56, plate heater 34 by way of plate heater line 58, acoustic system 60 by way of acoustic sensor line 62, and temperature sensor 50 by way of temperature sensor line 64. Voltage regulators of power management module 54 provide electric power with a stable voltage to mesh heater 32, plate heater 34, acoustic system 60, and temperature sensor 50. As is further described herein, the outputs from the acoustic system 60 and temperature sensor 50 are fed back to control module 40 by way of acoustic communication line 66 and temperature communication line 52, respectively, to continuously monitor the temperature and hydrate formation and accordingly control electric heaters 28.

Acoustic system 60 includes an acoustic transmitter and an acoustic receiver. The acoustic transmitter can send a sound wave across the diameter of pipeline 10 to be received by the acoustic receiver. Acoustic system 60 can measure sound travel time and provide the travel time to control module 40 by way of acoustic communication line 66. Such travel time can be processed to conduct a condition, such as determining a level of hydrate formation, and for alerting an operator of any excess hydrate formation. Acoustic travel time can also be used in detecting other conditions such as determining corrosion levels of pipeline 10 or hydrate prevention assembly 12 and well and any deposits or malfunctions associated with turbine assembly 16. This information can in turn be used to control the speed of turbine assembly 16 as a result of the detected conditions.

Figure 7:
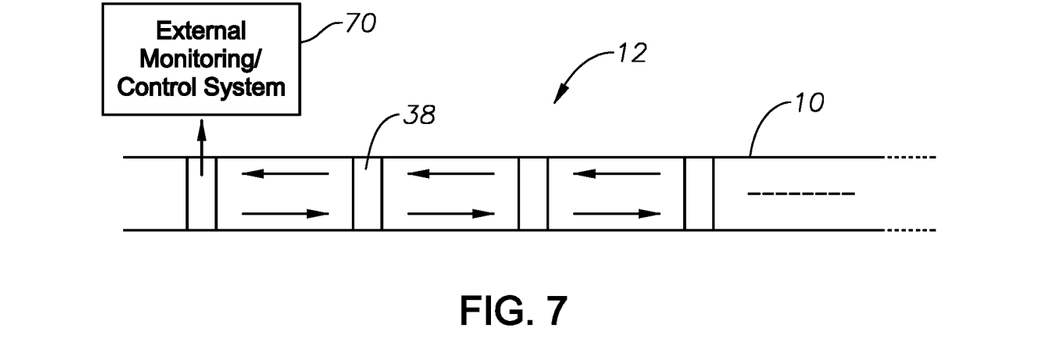
FIG. 7 is a schematic diagram of a wireless network system of a hydrate prevention assembly in accordance with an embodiment of this disclosure.

Looking at FIGS. 6-7, control system 38 can include wireless telemetry module 68 to communicate data or control signals between control module 40 and external monitoring and control system 70, which is outside of pipeline 10. In certain embodiments wireless telemetry module 68 can operate at RF frequencies of 400 or 900 MHz. In alternate embodiments, other wireless technologies or frequencies can be used, as are known in the art. The operation, status and health of hydrate prevention assembly 12 and pipeline 10 can be monitored by a remote operator through wireless telemetry module 68. In addition, commands can be sent by a remote operator through wireless telemetry module 68. For example, a control signal can be sent from external monitoring and control system 70 to control module 40 to shutdown turbine assembly 16 during summer period, to maintain a certain temperature inside pipeline 10 by changing the operating parameters for electric heater 28, or to shutdown a particular turbine assembly 16 if it has been damaged or if a fault has occurred.

In addition, as is seen in FIG. 7, control systems 38 associated with adjacent turbine assemblies 16 inside pipeline 10 are capable of wirelessly communicating with each other in a manner similar to a wireless sensor network. In such an embodiment, external monitoring and control system 70 acts as the gateway node for this wireless network system and the information or commands are propagated in a wireless hop manner, to or from external monitoring and control system 70.

In an example of operation, heater housing 14 that contains the supports elements of hydrate prevention assembly 12 is inserted into pipeline 10 and the flow of fluid within pipeline 10 pushes heater housing within pipeline 10 in the direction of the fluid flow. Additional heater housings with additional elements of hydrate prevention assembly 12 can be attached with flexible conductor 36 so that hydrate prevention assembly 12 includes a string of heater housings 14 with associated elements. The flow of fluid through pipeline 10 will also cause blade 20 of turbine assembly 16 to rotate. The rotation of blade 20 can be converted from a rotational energy to an electrical energy with generator 18. Blade 20 can also have scrubber 27 that is located at an outer surface of blade 20 so that as blade 20 rotates, scrubber 27 removes a material from an interior surface of pipeline 10 or heater housing 14, as applicable.

The electric energy generated by generator 18 can be provided to electric heater 28, which can heat both the fluid flowing through pipeline 10 as well as pipeline 10 itself to a temperature above hydrate formation temperature and can maintain the temperature of the fluid flowing through pipeline 10 as well as pipeline 10 itself at a temperature above hydrate formation temperature.

Control system 38 can be used to switch the electric heater between an on condition and an off condition in order to maintain the fluid flowing through pipeline 10 as well as pipeline 10 itself at a temperature above hydrate formation temperature. Control system 38 can also monitor and control the health of hydrate prevention assembly 12 and pipeline 10. As heater housings 14 travel along pipeline 10, information can be gathered regarding the status of hydrate formation and the health of pipeline 10 along the length of pipeline 10. When hydrate prevention assembly 12 reaches an end of pipeline 10, hydrate prevention assembly 12 can be removed from pipeline 10 and reinserted into the beginning of pipeline 10 at a later time. In other embodiments, hydrate prevention assembly 12 can be stationary and be located at the target hydrate formation zone, or can be stationary at some times during a year and move through pipeline 10 at other times of the year. As an example, in the beginning of the winter when the ambient temperatures are moderate, hydrate prevention assembly 12 can travel to prevent hydrate accumulation at the surface of pipeline 10, and when the ambient temperature is very low, such as in the middle of winter, and chances of hydrate formation are higher, then hydrate prevention assembly 12 can be stationary.

In an example of the power that can be generated according to embodiments of this disclosure, the follow equation can be used:

$$P = \frac{1}{2}\rho A V^3 C_p$$

Where:
ρ (kg/m3) is the density of the fluid flowing in pipeline 10;
A (m2) is the sweep area of the turbine blades;
V (m/s) is the velocity of the fluid flowing in pipeline 10; and
$C_P$ is the power coefficient of turbine assembly 16.

$C_P$ is related to power efficiency of the turbine and depends on the turbine design and speed of the fluid flowing past turbine assembly 16. The maximum theoretical value of CP is 0.59.

In an example field, pipeline 10 can extend from the gas field to a gas plant. Pipeline 10 can have an inner diameter of 38" (0.9652 m). Pipeline 10 can extend 68 miles (110 km).

Looking at FIG. 4, the power (P) can be calculated using the equation above and the following assumed values:
the approximate density of the natural gas is 0.7 kg/m3;
a gas flow rate of 100 mmscfd;
the number of blades is 3;
the rotor height RH is 0.5 m;
the rotor length RL is 0.5 m;
$C_P$=0.2;
TSR (Tip speed ratio)=2;
V=44.8 m/s for flow rate of 100 mmscfd;
RPM=1700; and
Sweep area=2×Blade Length×Turbine Radius=0.5 m².

For the above mentioned values: P=2.9 KWatts.

Heating elements can have a have very high conversion efficiency. Assuming a conversion efficiency factor of 0.5, for an electrical power of 2.9 KW, the heat generated can be ~4950 BTU/hr.

Calculating the accurate heat flow in pipeline 10 is a complex thermodynamics problem that depends on a large number of parameters including thermal conductivity of natural gas, dimensions of pipeline 10 (inner and outer radius), thermal properties of pipeline 10, ambient temperature outside pipeline 10, gas flow rate, pressure drop and many others.

This disclosure provides systems and methods for preventing hydrate that does not require outside energy to rotate blades 20 of turbine assembly 16 but instead utilizes gas flow energy. No chemicals are added, and no additives or inhibitors are used. Embodiments disclosed herein can target any intervals of interest along the length of pipeline 10 and can deal with hydrate prior formation.

Embodiments of the present disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the disclosure and the scope of the appended claims.

What is claimed is:

1. A method for preventing hydrate formation in a pipeline, the method comprising:

providing a heater housing, the heater housing having an outer diameter sized to travel within the pipeline;

locating a turbine assembly within the heater housing, the turbine assembly having a blade that is rotatable by a flow of fluid within a central bore of the pipeline;

locating an electric heater within the heater housing and electrically connecting the electric heater to the turbine assembly;

inserting the heater housing into the pipeline so that the electric heater contacts and heats the flow of fluid within the central bore of the pipeline and the flow of fluid in the pipeline causes a rotation of the blade; and using the flow of fluid within the central bore of the pipeline to move the heater housing axially along a length of the pipeline to heat the flow of fluid within the central bore of the pipeline along the length of the pipeline during operation of the electric heater.

2. The method according to claim 1, further comprising converting the rotation of the blade to an electric power with a generator and conveying the electric power to the electric heater with an electrical connector that extends from the generator to the electric heater.

3. The method according to claim 1, further comprising switching the electric heater between an off condition and an on condition with a control system that is connected to the electric heater.

4. The method according to claim 1, further comprising sensing a real time temperature within the pipeline with a temperature sensor of a control system and switching the electric heater from an off condition to an on condition with the control system when the real time temperature falls below a lower temperature limit.

5. The method according to claim 1, further comprising sensing a real time temperature within the pipeline with a temperature sensor of a control system and switching the electric heater from an on condition to an off condition with the control system when the real time temperature rises above an upper temperature limit.

6. The method according to claim 1, further comprising controlling a rate of rotation of the blade with a control system that is connected to the turbine assembly.

7. The method according to claim 1, further comprising providing an acoustic system having an acoustic transmitter and an acoustic receiver, transmitting an acoustic signal with the acoustic transmitter, receiving the acoustic signal with the acoustic receiver, and measuring a sound travel time between the acoustic transmitter and the acoustic receiver.

8. The method according to claim 7, wherein the acoustic system is in communication with a control system connected to the turbine assembly, the method further comprising determining a condition of one of the pipeline, the turbine assembly and the flow of fluid from the sound travel time, and adjusting the performance of the turbine assembly with the control system as a result of the condition.

9. The method according to claim 1, further comprising providing a second turbine assembly, electrically connecting the turbine assemblies with a flexible conductor, and spacing the turbine assemblies apart within the pipeline.

10. The method according to claim 1, where the electric heater is a plate heater and the method further includes positioning the plate heater at an angle relative to the flow of fluid through the pipeline so that the plate heater functions as a choke, forcing the fluid within the pipeline to pass through a narrow path so that the molecules bombard each other, creating friction and heat within the molecules.

* * * * *